(12) United States Patent
Chou et al.

(10) Patent No.: US 7,258,942 B2
(45) Date of Patent: Aug. 21, 2007

(54) MULTILAYER COMPRESSIVE SEAL FOR SEALING IN HIGH TEMPERATURE DEVICES

(75) Inventors: Yeong-Shyung Chou, Richland, WA (US); Jeffry W. Stevenson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 457 days.

(21) Appl. No.: 10/656,300

(22) Filed: Sep. 4, 2003

(65) Prior Publication Data

US 2004/0048137 A1    Mar. 11, 2004

Related U.S. Application Data

(63) Continuation-in-part of application No. 10/134,072, filed on Apr. 26, 2002.

(51) Int. Cl.
*H01M 2/00* (2006.01)
*F16J 15/08* (2006.01)

(52) U.S. Cl. .................... 429/34; 429/35; 277/650; 277/943

(58) Field of Classification Search ............ 429/34, 429/35, 185; 277/652, 654, 650, 943
See application file for complete search history.

(56) References Cited

U.S. PATENT DOCUMENTS 6,430,966 B1    8/2002    Meinhardt
6,532,769 B1 *  3/2003    Meinhardt et al. ......... 65/33.5
6,565,099 B1 *  5/2003    Ottinger et al. ............ 277/608

FOREIGN PATENT DOCUMENTS

GB          2312479        * 10/1997

OTHER PUBLICATIONS

Y-S Chou, J. W. Stevenson, and L, A. Chick; "Ultra-low leak rate of hybrid compressive mica seals for solid oxide fuel cells", Journal of Power Sources, 112, pp. 130-136 (2002).
Y-S Chou, and J. W. Stevenson, "Thermal cycling and degradation mechanisms of compressive mica-based seals for SOFCs", Journal of Power Sources, 112 pp. 373-383 (2002).
S.P. Simner and J. Stevenson, "Compressive mica selas for SOFC applications," Journal of Power Sources, 102, pp. 310-316 (2001).
Y-S Chou, J. W. Stevenson, and L, A. Chick, "Mid-term stability of novel mica-based compressive seals for solid oxide fuel cells",Journal of Power Sources,115 pp. 274-278 (2003).

* cited by examiner

*Primary Examiner*—Raymond Alejandro
(74) *Attorney, Agent, or Firm*—James D. Matheson

(57) ABSTRACT

A mica based compressive seal has been developed exhibiting superior thermal cycle stability when compared to other compressive seals known in the art. The seal is composed of compliant glass or metal interlayers and a sealing (gasket) member layer composed of mica that is infiltrated with a glass forming material, which effectively reduces leaks within the seal. The compressive seal shows approximately a 100-fold reduction in leak rates compared with previously developed hybrid seals after from 10 to about 40 thermal cycles under a compressive stress of from 50 psi to 100 psi at temperatures in the range from 600° C. to about 850° C.

11 Claims, 4 Drawing Sheets

MULTILAYER COMPRESSIVE SEAL FOR SEALING IN HIGH TEMPERATURE DEVICES

This application is a Continuation-In-Part of application Ser. No. 10/134,072, filed Apr. 26, 2002 now U.S. Publication No. 2003-0203267A1 published Oct. 30, 2003.

The invention was made with Government support under Contract DE-AC0676RLO 1830, awarded by the U.S. Department of Energy. The Government has certain rights in the invention.

FIELD OF THE INVENTION

The present invention relates to an advanced multilayer compressive seal, generally. More particularly, the present invention relates to an advanced mica-based sealing (gasket) member for use in multilayer compressive seals applicable to high-temperature devices and methods of making and using. High-temperature devices include electrochemical devices such as solid oxide fuel cells, syngas generators, and membrane reactors whereby different gaseous streams internal to the device at elevated temperatures must be kept separate from each other. The sealing member and compressive seal of the present invention exhibit superior thermal cycling stability and low effective leak rates compared to other seals known in the art.

BACKGROUND OF THE INVENTION

High-temperature devices that can convert chemical energy of a fuel such as hydrogen directly into electrical energy at high efficiency and low or no air pollution are of great commercial interest. Such devices include high-temperature electrochemical devices, solid oxide fuel cells (SOFC), and other similar structures such as interconnects. Electrochemical devices having multiple components, such as, for example, solid oxide fuel cell (SOFC) stacks, syngas membrane reactors, oxygen generators and the like require seals to separate the various gaseous components [e.g., $H_2$ (fuels) and $O_2$ (oxidants)] and to prevent the streams from mixing with each other. Mixing of the gas streams has a variety of negative consequences, depending upon the type of device and the composition of the gaseous streams. One major problem resulting from mixing of such gases is the possibility of thermal combustion of the gases and the resulting failure of the device. Thus, to ensure high efficiency and to maintain the stack structural integrity, seals are needed to separate the various gaseous components (fuels and oxidants). Such seals must be non-conducting, have chemical, mechanical, and/or thermal compatibility with other structural components of the devices. The seals must also exhibit very low operational leak rates in severe (oxidizing, reducing, and humid) environments as well as long-term thermal cycling stability at elevated temperatures.

Continued thermal cycling at high operating temperatures up to about 850° C. results in increased leak rates in mica-based compressive seals, a consequence of damage resulting from fragmentation, cleavage, micro-stress fractures, and similar processes to the microstructure of the mica substrate matrix. Such damage introduces leak paths or void spaces (interstices) that are continuous in three dimensions. High leak rates and thermal cycling instability of current seals under routine high temperature operation represent two of the most challenging hurdles remaining for significant advancement to be made in the long-term success of high-temperature devices, including electrochemical devices such as SOFCs, and/or toward developing and/or deploying long-term viable components in other similar high temperature devices.

Accordingly, there remains a need to provide advanced seals and sealing structures having low effective leak rates and superior thermal cycling stability such that at the operating temperatures of these high temperature devices (up to about 850° C.), gaseous leaks (e.g., $H_2$ gas into the air stream or vice versa) do not cause undesirable local heating leading to structural or functional failure of the device.

SUMMARY OF THE INVENTION

The present invention relates generally to components, structures, and methods for preparing seals applicable for sealing in high-temperature devices. More particularly, the present invention is an advanced mica-based sealing (gasket) member that finds application in multilayer compressive seals useful in high-temperature devices such as electrochemical cells, solid oxide fuel cells, gas reactors, syngas reactors, and the like. The sealing member of the present invention exhibits superior thermal cycling stability and effectively low leak rates at high operating temperatures up to about 850° C., and methods for making and using the same.

In a previous invention (U.S. Publication No. 2003-0203267A1 published Oct. 30, 2003) we have demonstrated that by adding additional compliant interlayers (glass or metal) to mica-based seals, leak rates at about 800° C. can be reduced several thousand times compared to mica-based seals presently known in the art. In conjunction with the current invention, a barium calcium aluminum borosilicate glass (e.g., 35 mol % BaO, 15 mol % CaO, 5 mol % $Al_2O_3$, 10 mol % $B_2O_3$, and 35 mol % $SiO_2$), also known as G-18 ® glass, is one of a number of representative materials available commercially (e.g., Viox Corp., Seattle, Wash., USA) that exhibit excellent Coefficient of Thermal Expansion (CTE) matching properties, as detailed, e.g., by Meinhardt et al. in U.S. Pat. Nos. 6,430,966 and 6,532,769, incorporated herein by reference. As demonstrated herein, such glass compositions are suitable for use in, e.g., SOFC and electrochemical devices.

The multilayer compressive seal of the instant invention comprises a sealing (gasket) member having a mica based member infiltrated with at least one member selected from of a group of a suitable glass forming, melt forming, or composite material(s), and, at a minimum, two (2) compliant glass or metal interlayers disposed so as to be aligned with the opposing surfaces of the sealing member. The sealing member may also be disposed so as to be in contact with other materially and functionally important substrates, layers, surfaces, junctions, interconnects, or components of the compressive seal or of the target application or device. For example, bounding surfaces of a typical high-temperature device include such components as cathodes, anodes of an electrochemical stack or device, YSZ components, interconnects, ceramics, SOFC junctions and components, and the like. In one embodiment of the present invention, the compliant glass or metal interlayers are disposed along the opposing surfaces of an infiltrated sealing (gasket) member in further contact with a bounding surface electrolyte or interconnect, thereby acting as an interface between the sealing member and other non-compliant surfaces.

In a preferred embodiment, the sealing (gasket) member of the present invention comprises mica in a paper form, e.g., as discrete flak pressed into a thin paper. Suitable micas include the minerals Phlogopite (potassium magnesium aluminum silicate hydroxide, [KMg$_3$AlSi$_3$O$_{10}$F(OH)] and Muscovite (potassium aluminum silicate hydroxide [KAl$_2$AlSi$_3$O$_{10}$F(OH)$_2$]) available commercially (e.g., from McMaster-Carr, Atlanta, Ga. and Cogebi Inc., Dover, N.H.). Other micas suitable for use include the minerals Biotite (potassium magnesium iron aluminum silicate hydroxide, [K(Mg,Fe)$_3$(AlFe)Si$_3$O$_{10}$(F,OH)$_2$]), Fuchsite (potassium aluminum chromium silicate hydroxide [K(Al,Cr)$_2$(AlSi$_3$O$_{10}$(F,OH)$_2$]), Lepidolite (potassium lithium aluminum silicate hydroxide [KLi$_2$ Al (Al, Si)$_3$O$_{10}$(F,OH)$_2$]), and Zinnwaldite (potassium lithium iron aluminum silicate hydroxide [KLiAl (AlSi$_3$)O$_{10}$(F,OH)$_2$]).

For compressive seals, a degree of mismatch exists between the various components of the compressive seal or device. To minimize the mismatch, the sealing member of the present invention preferably comprises mica having a Coefficient of Thermal Expansion (CTE) in the range from 7-17 ppm/° C. Phlogopite, for example, has an average (room temperature to ~800° C.) CTE of about 10 ppm/° C.; Muscovite has a comparable CTE of about 7 ppm/° C. Comparable metallic components (for example, interconnects for use in SOFCs) have preferred CTE values in the range from about 12 ppm/° C. to 17 ppm/° C. In addition, the selected micas are preferably of a paper form (i.e., as discrete flakes pressed into a thin paper) thereby providing an open matrix structure and for ease of handling. For example, Phlogopite mica papers are easily infiltrated by delivering the infiltrating material (e.g., dissolved or solvated glass or melt forming material) in a carrier liquid to the top of the mica paper. In addition, they remain at a relatively constant thickness during handling. The as received naturally cleaved Muscovite mica, being in a monolithic form, has no porosity but does cleave into multiple sublayers (~2-10 microns thick) after firing to a temperature >600° C. as it loses chemical water (~4%) and tends to expand significantly in apparent thickness as the sublayers become separated from each other. Since the naturally cleaved Muscovite mica as received has no cracks or openings in the top sublayer, the infiltrating process requires soaking the whole mica sheet in the applicable infiltrating liquid or material. The sealing (gasket) member is preferably of a thickness in the range from about 25 microns to about 1 millimeter. However, thickness of the mica is less important than that the mica be properly infiltrated and prepared for use as described hereinafter.

Prior to infiltration, the mica sealing member substrate may be heated in an oven at a temperature between 500° C. to 700° C. for from 1 to 4 hours to remove any organic binders (typically present at about 3-4% by weight in standard commercially available mica papers). Infiltration of the sealing (gasket) member generally comprises introducing a glass or melt forming material into the matrix of the mica substrate such that continuous flow paths representing potential and real leak paths within the matrix are effectively blocked and/or sealed. The infiltrating material comprises at least one member of a suitable group of glass or melt forming materials, oxides, composites, mica:glass composites, or like material(s). Upon heating, the infiltrating material becomes fixed in the plurality of spaces (voids, flow paths, leak paths, necking areas, interstitial spaces, gaseous leak paths, etc.) of the sealing member, creating discontinuities in the three dimensional flow paths of the substrate matrix, thereby effecting sealing. The infiltrated sealing member likewise effects sealing when incorporated in a multilayer compressive seal or selected high temperature device.

In one embodiment of the method of the present invention, infiltrating a sealing member for use as a sealing (gasket) member comprises the steps: 1) infiltrating (permeating) the sealing member matrix (mica substrate, paper, etc.) with an infiltrating material, for example, a saturated liquid solution comprising a dissolved or solvated glass (or melt) forming material, 2) fixing (adhering) the glass forming material within the voids (and more specifically at junctions, necking areas, and/or interstitial spaces) of the matrix, for example, by drying the sealing member in an oven at a temperature of about 50° C. for ~1 hour, and 3) incorporating the infiltrated sealing member in a compressive seal, (e.g., in a hybrid multilayer seal under a selected compressive stress), or assembling the sealing member as a component in a high-temperature device for a desired application. For example, an infiltrated sealing member incorporated in a compressive seal, electrochemical device, SOFC, or comparable device under compressive stresses in the range from 25 psi to 300 psi, more preferably in the range from 50 psi to 100 psi.

In yet another embodiment of the method of the present invention, infiltrating the sealing member alternately comprises the steps: 1) providing an infiltrating material comprising mica (e.g., flakes or particles) and a glass (or melt) forming material in a mica:glass composite, 2) forming and/or fashioning a sealing (gasket) member in a desired shape and thickness using standard glass forming, preparation, manufacturing, and/or processing techniques known to those of ordinary skill in the art, e.g., slip-casting, tape casting, tape calendaring, die pressing, or the like), 3) fixing the infiltrated material within the sealing (gasket) member matrix at room temperature for ~4 hours or a temperature of 50 ° C. for ~1 hour, and 4) incorporating the infiltrated sealing member in a compressive seal, or assembling in a high-temperature device.

It will be recognized and appreciated by persons of ordinary skill in the art that infiltrating the mica-based matrix may be accomplished in a variety of different ways. Thus, no limitation in scope is herein intended by the disclosure of the preferred embodiments.

BRIEF DESCRIPTION OF THE DRAWINGS

A more complete appreciation of the invention will be readily obtained by reference to the following description of the accompanying drawings in which like numerals in different figures represent the same structures or elements.

DETAILED DESCRIPTION OF THE INVENTION

Figure 1A:
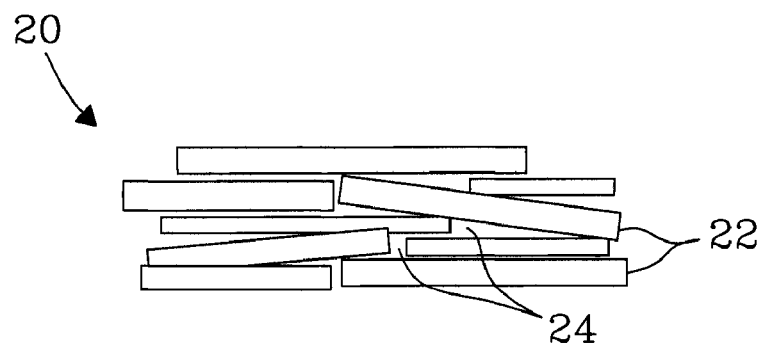
FIG. 1A. illustrates the microstructure in a commercially available mica paper showing a continuous three-dimensional leak path following "burnout" of the organic binder.
Figure 1B:
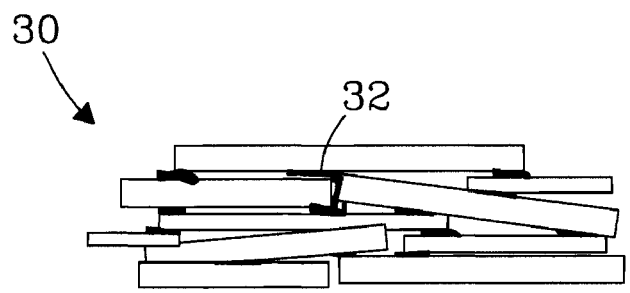
FIG. 1B. shows a schematic drawing of a representative mica paper infiltrated with a glass or melt forming material. The figure shows the infiltrated mica paper at elevated temperature under applied stress with the continuous leak path being blocked.
Figure 1C:
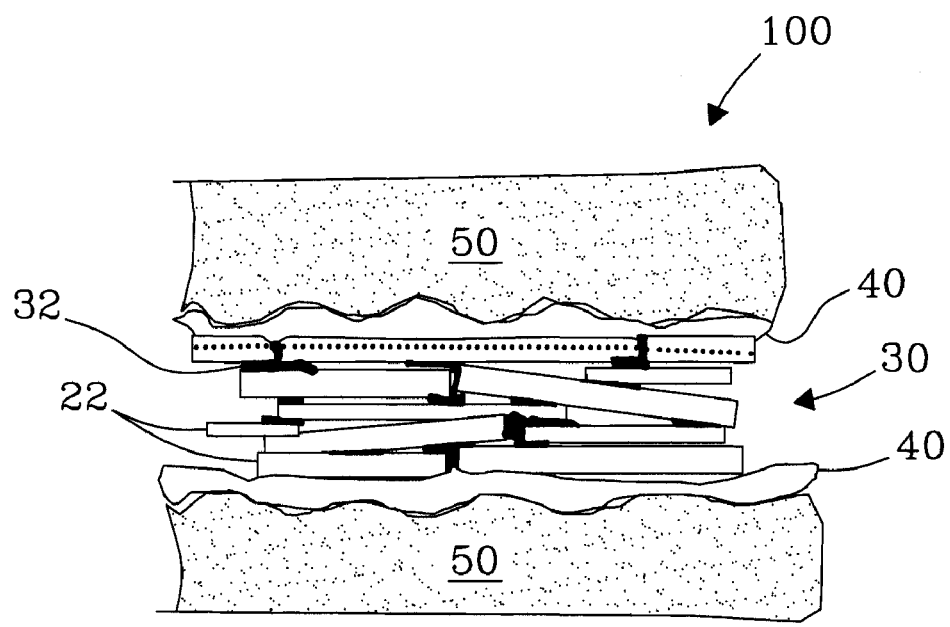
FIG. 1C. illustrates the differences in leak paths for the as-received mica and the infiltrated mica paper (in a hybrid design with a compliant interlayer disposed adjacent on opposite sides of the mica paper). The leak path in the as received mica paper is continuous in three (3) dimensions.

FIGS. 1A-1-C illustrate the components of an advanced mica-based sealing (gasket) member 30 and compressive seal 100 according to an embodiment of the present invention. The sealing member 30 is generally composed of a mica paper 20 comprising overlapping mica flakes 22 compressed in a thin paper form and a plurality of spaces (voids, flowpaths, interstices, necking areas, leak paths, etc.) 24 (FIG. 1A). The microstructure and thermal behavior of mica papers have been described in some detail elsewhere (see "Ultra-low Leak Rate of Hybrid Compressive Mica Seals for SOFCs", Yeong-Shyung Chou, Jeffry W. Stevenson, and Lawrence A. Chick, Pacific Northwest National Laboratories, Materials Resource Department, P.O. Box 999 Richland, Wash. 99352) hereby incorporated by reference. The sealing member 30 is infiltrated as shown in FIG. 1B whereby the voids and interstitial spaces of the mica paper 20 substrate or matrix are filled, sealed, or otherwise made discontinuous with an infiltrating material 32. As shown in FIG. 1C, the infiltrated sealing member 30 may then be incorporated as a central sealing component of a compressive seal 100 or other high temperature device. The seal 100 further comprises a $1^{st}$ and $2^{nd}$ interlayer 40 of a compliant material, as for example, glass or metal (metal or metal foil), and a $1^{st}$ and $2^{nd}$ bounding component 50, for example a $1^{st}$ and $2^{nd}$ SOFC component (component I and component II in FIG. IC). The interlayers 40 may be of an identical or different material in the seal 100 depending on the selection of bounding surface materials or components 50.

Two Phlogopite [$(KMg_3(AlSi_3O_{10})(OH)_2)$] mica papers were tested, Sample A [Phlogopite paper, McMaster-Carr, Atlanta, Ga.] having a nominal thickness of about 100 microns (~4 mils), and Sample B [Cogemica AP-80, Cogebi Inc., Dover, N.H.] having a thickness of about 75 microns (~3 mils). Sample A contained an organic binder (between 2-5% by weight); Sample B contained no organic binder. Examples 1 through 4 present different embodiments of an infiltrated sealing (gasket) member 30 that may be assembled in a compressive seal 100 or incorporated into a high-temperature device.

EXAMPLE 1

In one embodiment, the infiltrated sealing (gasket) member 30 was prepared using a liquid infiltration solution comprising at least one glass or melt forming material. The solid glass former was dissolved in an aqueous liquid to a point of saturation, and subsequently delivered into a plurality of spaces 24 (e.g., voids, interstices, flow paths, leak pathways, etc.) within the matrix of the mica substrate 20 using standard liquid delivery techniques (e.g., pipet). Subsequent drying of the substrate 20 fixes the glass or melt former within the matrix, preparing the infiltrated sealing (gasket) member 30 for use. The sealing member 30 was subsequently leak tested in a simulated multilayer compressive seal (hybrid) 100 under a selected compressive stress in the range from 50 to 100 psi under repeated thermal cycling conditions and at expected operating temperatures up to 850° C., and more preferably in the range from 650° C. to 850° C.

Experimental

Figure 2:
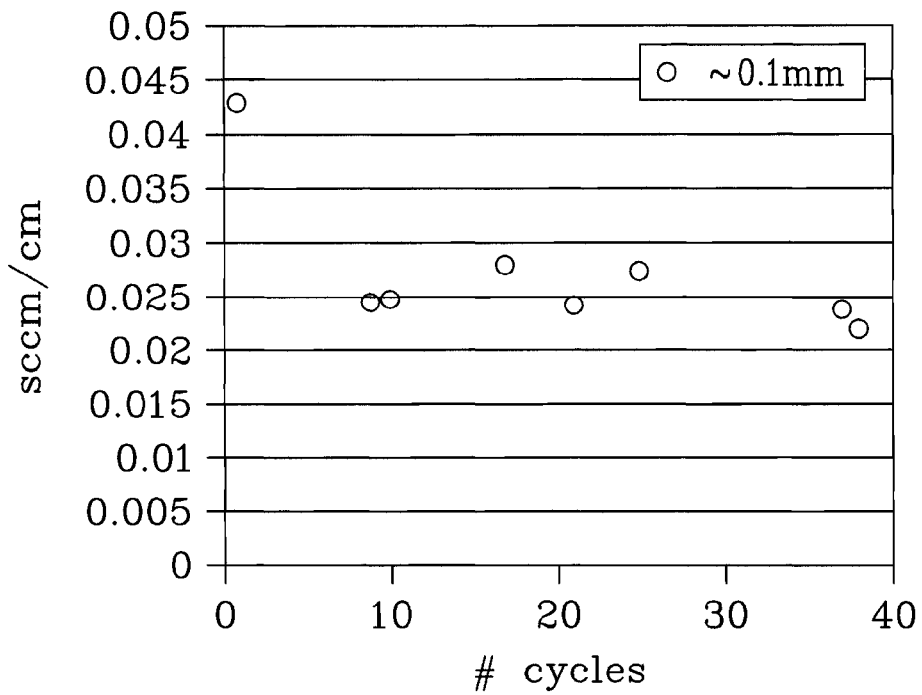
FIG. 2 illustrates the effect of thermal cycling on normalized leak rates for a non-infiltrated Phlogopite mica paper.

Sample A was heat treated at ~700° C. for 4 hours to remove organic binders present in the substrate matrix prior to the liquid infiltration step. Sample B was used as received. FIG. 1A illustrates the typical mica paper following removal of any organic binder (e.g., after "burnout"). The figure shows a plurality of spaces (voids, continuities, flow paths, interstitial spaces) 24 of the mica substrate 20 member, prior to infiltration, comprising three-dimensional flow paths largely responsible for generating gaseous leaks in a high-temperature device. FIG. 2 presents normalized leak rates as a function of thermal cycles for a typical non-infiltrated Phlogopite mica (nominal thickness of about 0.1 mm), illustrating the effect of thermal cycling. As shown in the figure, thermal cycling under a compressive load of 100 psi leads to unacceptable leak rates for the non-infiltrated mica paper, about 0.025 sccm/cm, on average.

Glass or melt forming materials suitable for infiltrating and preventing leaks in the mica substrate are preferably a) non-corrosive, b) soluble in an aqueous medium, miscible in an organic solvent (e.g., Methyl Ethyl Ketone), or mobile in a carrier liquid, and c) have melting point (MP) temperatures above 450° C., more preferably in the range from about 450° C. to about 850° C. so as to be operable in a high-temperature device. Solubility of a glass or melt forming material is a selection criterion based in part on convenience and ease of use. For example, boric acid ($H_3BO_3$) has proven to be an excellent candidate based in part on its aqueous solubility, as well as its melting point properties. Bismuth nitrate [$Bi(NO_3)_3.5H_2O$] is equally workable despite its more limited aqueous solubility due to its operable melting point. Both candidates are suitable infiltrating materials for effecting sealing in a sealing (gasket) member 30 destined for incorporation in a high temperature device. In contrast, pure $SiO_2$, another oxide, is not an ideal material for infiltrating the sealing (gasket) member 30 given its many crystalline phases and exceptionally high melting point (~1400° C.). As another example, pure $P_2O_5$ is an equally daunting material, given the corrosivity and reactivity in the reducing and wet environments of an SOFC. The person of ordinary skill in the art will recognize that many materials may be suitable as infiltrating materials. For example, selection criteria may be appropriately based on 1) material oxidation states, 2) glass or melt forming properties, 3) associated chemical properties, e.g., solubility, melting points, etc., 4) solvation properties in various liquid carriers and/or solvents, and 5) other properties associated with the material mixtures or compositions. Thus, no limitation is hereby intended by the disclosure of the preferred embodiments.

In a first embodiment of the method of the present invention, boric acid ($H_3BO_3$) was selected for use as a glass forming material for infiltration, given its high aqueous solubility and ease of handling. A saturated infiltration solution was prepared by dissolving an excess of $H_3BO_3$ in de-ionized water. The temperature for infiltrating the matrix of the mica paper 20 substrate of the sealing member 30 was selected to be in the range from 70° C. to 90° C. where boric acid has higher solubility. The boric acid solution was delivered via standard pipette into the matrix (by wetting, dripping, wicking, etc.) of the mica paper 20, thereby infiltrating (saturating and fully permeating) the sealing member 30. The infiltrated and/or treated sealing member (saturated mica paper) 30 was subsequently oven dried in air at a temperature of approximately 50° C. for between 0.5 and 1 hour to fix and stabilize the infiltrating material 32 in the matrix. At the drying temperature, boric acid converts to the oxide form ($B_2O_3$) within the matrix of the sealing (gasket) member 30. As illustrated in FIG. 1B, the infiltrating material 32 becomes fixed in a plurality of spaces 24 (voids, interstices, etc.) at critical interstitial contact points, necking areas, between, along, and around the original mica flakes 22 or filaments 22 within the sealing member 30 matrix. Preferably, the glass or melt forming material or oxide has a melting temperature of >450° C. At high temperatures, the infiltrating material effects blocking and/or sealing of three-dimensional leak paths making them discontinuous (as opposed to continuous) and limited in two dimensions (as opposed to three dimensions).

The sealing member 30 samples were subsequently leak tested following infiltration. Leak rates for the sealing member 30 were determined by incorporating the member 30 in a test mode hybrid multilayer seal 100 (e.g., sandwiched between two glass interlayers 40 pressed between an Inconel 600 pipe and an alumina substrate 50) and pressed at 100 psi using ultra-high purity Helium at a pressure gradient of 2 psi across the compressive seal 100. A detailed description of the leak testing protocol for a multilayer (hybrid) compressive seal has been detailed in [U.S. application, Ser. No. 10/134,072 filed Apr. 26, 2002], which disclosure is incorporated by reference.

Results

Figure 3:
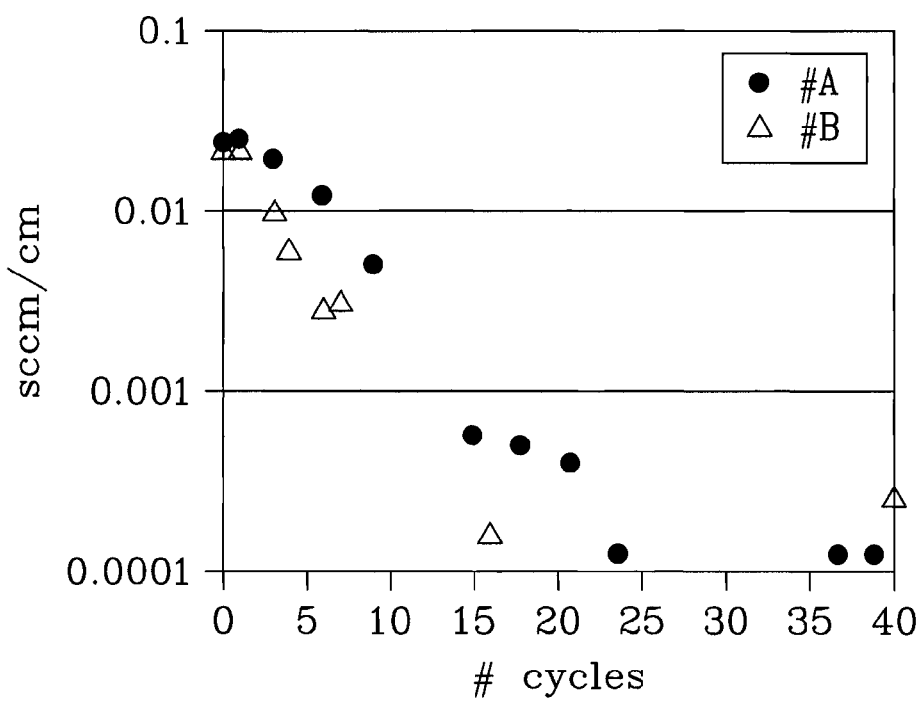
FIG. 3 illustrates shows the leak rates of two H$_3$BO$_3$ (aq) infiltrated Phlogopite mica papers (Samples A and B) versus the number of thermal cycles.

FIG. 3 compares normalized leak rates at 800° C. for two $H_3BO_3$ infiltrated paper (samples A and B) Phlogopite mica compressive seals 100 as a function of thermal cycles, tested under a compressive stress of 100 psi. TABLE 1 presents tabulated leak rate data, determined using ultra-high purity Helium at a pressure gradient of 2 psi across the mica seal 100.

A detailed description of the leak testing protocol for multilayer (hybrid) compressive seal has been detailed in U.S. Publication No. 2003-0203267A1 published Oct. 30, 2003), which disclosure is incorporated by reference.

TABLE 1

Normalized leak rates at 800° C. under a compressive stress of 100 psi of an $H_3BO_3$-infiltrated mica-based compressive seal as a function of thermal cycles.

| # cycles | #A, as-received | # cycles | #A, infiltrated | # cycles | #B, infiltrated |
|---|---|---|---|---|---|
| 0 | 0.0429 | 0 | 0.023 | 0 | 0.022 |
| 8 | 0.0244 | 1 | 0.0243 | 1 | 0.0217 |
| 9 | 0.0248 | 3 | 0.0188 | 3 | 0.0099 |
| 9 | 0.029 | 4 | | 4 | 0.00595 |
| 13 | 0.0415 | 6 | 0.0116 | 6 | 0.00287 |
| 16 | 0.0279 | 7 | | 7 | 0.0031 |
| 20 | 0.0227 | 9 | 0.00495 | 9 | |
| 20 | 0.0255 | 12 | | 12 | |
| 24 | 0.0267 | 15 | 0.000554 | 15 | |
| 24 | 0.0281 | 16 | | 16 | 0.000164 |
| 36 | 0.024 | 18 | 0.00049 | 18 | |
| 36 | 0.0236 | 21 | 0.00039 | 21 | |
| 37 | 0.0217 | 24 | 0.000125 | 24 | |
| 37 | 0.0228 | 25 | | 25 | |
| 40 | 0.0209 | 33 | | 33 | |
| 40 | 0.0234 | 36 | | 36 | |
| 44 | 0.0233 | 37 | 0.000125 | 37 | |
| 44 | 0.0293 | 39 | 0.000125 | 39 | |
| 48 | 0.0205 | 40 | | 40 | 0.000269 |

As shown in TABLE 1, leak rates were stable after about 10 thermal cycles for both samples and leak rates for the subsequent ~30 thermal cycles were very low (<0.001 sccm/cm). As compared to the Phlogopite mica paper without the $H_3BO_3$ (aq) infiltration (FIG. 2), the normalized leak rates for the infiltrated samples (FIG. 3) are approximately an order of magnitude better, at a minimum, than the non-infiltrated sample (FIG. 2) and several orders of magnitude better at a maximum.

EXAMPLE 2

In a second embodiment of the present invention, infiltration of the sealing member 30 was conducted as described in Example 1 with the substitution of $Bi(NO_3)_3$ in a liquid carrier as the infiltrating liquid, as described hereafter.

Experimental

The infiltrating liquid was prepared by introducing 20-26 g $Bi(NO_3)_3$ solid (98% $Bi(NO_3)_3.5H_2O$, Alfa Aesar, Ward Hill, Mass.) in 50 mL of de-ionized water at room temperature. Formation of subnitrates (due to a more limited solubility of bismuth nitrate) in the aqueous medium was not found to compromise the beneficial infiltrating properties of the bismuth nitrate. Infiltration was subsequently conducted at room temperature, as described in Example 1. Following infiltration, the sealing member 30 was oven dried at 50° C. for between 0.5 and 1 hour to fix the infiltrating (glass forming) material 32 within the substrate of the sealing member 30. Heating of the bismuth nitrate converts it to the oxide form ($Bi_2O_3$) which has a melting point temperature of ~815° C. At the operating temperature of a high temperature device (>450° C.), the presence of the glass or melt former effectively seals the plurality of spaces 24 (e.g., continuous flow paths, interstitial spaces, etc.) and/or voids 24 present in the sealing member 30 under compressive stress. Leak testing was subsequently conducted under a compressive stress of 100 psi in a hybrid multilayer assembly, e.g., the mica layer was sandwiched between two glass (G18) interlayers 40 and pressed alternately between three different metal couples 50: Inconel600 pipe/Inconel600 block, Inconel600 pipe/SS430 block, and Inconel600 pipe/Haynes230 block. Coefficients of thermal expansion (CTE) of the three metal couples 50 used were 16 to ~17 ppm/° C. (Inconel600), ~12.5 ppm/° C. (SS430), ~14.8 ppm/° C. (Haynes230), respectively. The CTE of the Phlogopite mica 20 was about 10 ppm/° C. The three metal couples 50 represent a wide range of CTE mismatches by which to test the Phlogopite mica 20 and the infiltrated sealing member 30 compatibility. Any subnitrate residues remaining on the surface of the mica paper after infiltrating the mica substrate were found to penetrate into the matrix under the elevated temperatures and compressive stresses in the test mode assembly.

Results

Figure 4:
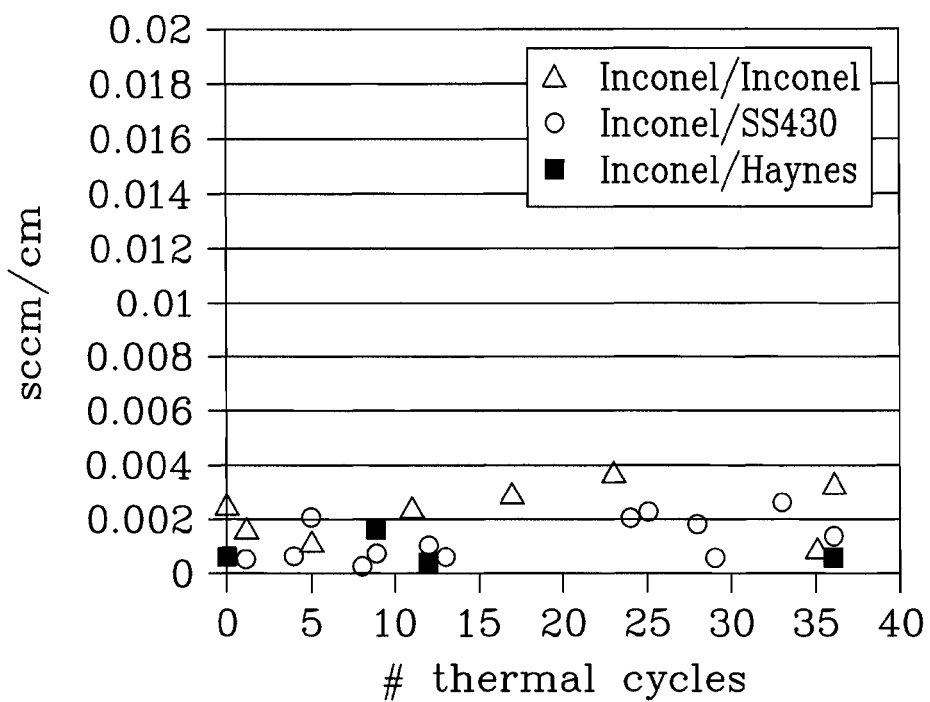
FIG. 4 illustrates the thermal cycling effect on normalized leak rates at 800° C. of the $Bi(NO_3)_3$(aq)-infiltrated Phlogopite mica.

FIG. 4 shows the effect of thermal cycling on the normalized 800° C. leak rates for the $Bi(NO_3)_3$ (aq) infiltrated Phlogopite mica seals 100, tested under a compressive stress of 100 psi. TABLE 2 presents the normalized leak rates for the $Bi(NO_3)_3$-infiltrated Phlogopite compressive mica seal 100 after 36 thermal cycles. As shown, leak rates were below 0.002 sccm/cm on average after 10 thermal cycles, and at best showed a leak rate of 6.0E-04 following 36 thermal cycles, demonstrating strong thermal cycle stability and effectively low leak rates in the $Bi(NO_3)_3$ (aq)-infiltrated mica seal 100 as compared to the non-infiltrated seals (FIG. 2).

TABLE 2

Normalized leak rates of the Bi(NO$_3$)$_3$ (aq)-infiltrated Phlogopite mica pressed between various metal couples.

| #cycles | Inconel/<br>Inconel<br>sccm/cm | #cycles | Inconel/<br>SS430<br>sccm/cm | #cycles | Inconel/Haynes230<br>sccm/cm |
|---|---|---|---|---|---|
| 0  | 2.5E-03 | 0  | 4.7E-04 | 0  | 6.1E-04 |
| 1  | 1.7E-03 | 1  | 4.5E-04 | 9  | 1.6E-03 |
| 5  | 1.2E-03 | 4  | 6.0E-04 | 12 | 3.4E-04 |
| 11 | 2.5E-03 | 5  | 2.0E-03 | 36 | 6.0E-04 |
| 17 | 3.0E-03 | 8  | 2.3E-04 |    |         |
| 23 | 3.8E-03 | 9  | 7.0E-04 |    |         |
| 35 | 1.0E-03 | 12 | 1.0E-03 |    |         |
| 36 | 3.4E-03 | 13 | 6.0E-04 |    |         |
|    |         | 24 | 2.0E-03 |    |         |
|    |         | 25 | 2.2E-03 |    |         |
|    |         | 28 | 1.8E-03 |    |         |
|    |         | 29 | 6.0E-04 |    |         |
|    |         | 33 | 2.6E-03 |    |         |
|    |         | 36 | 1.4E-03 |    |         |

EXAMPLE 3

In yet another embodiment of the present invention, an infiltrated sealing (gasket) member 30 was formed, filled, and sealed with a composite material, a preferred material being a mica-glass (G-18) composite. More specifically, mica flakes 22 or particles 22 ranging in size from a few hundred microns to a few mm were premixed with a glass or melt forming material in a liquid carrier (aqueous or organic solvent(s)). An organic solvent(s) as a liquid carrier was preferred for mixing (e.g., MEK) over the aqueous alternative(s) given the excellent mixing in the composite mixture, the rapid evaporation of the solvent(s), and the faster drying times. Mixing was best effected using a ball-mill or comparable mixer. The sealing (gasket) member 30 was subsequently formed, defined, and/or otherwise applied using standard ceramic processing techniques known to those of ordinary skill in the art. Conventional ceramic processing methods include slip casting, tape casting, tape calendaring, die pressing, and like methods. In a preferred embodiment, an infiltrated sealing member 30 was prepared from a mica:glass composite comprising 90 v % Phlogopite mica and 10 v % glass (G18 glass powder), using tape cast processing as detailed below.

Experimental 26.45 g mica flakes (Cogemica, PP120, Cogebi Inc., NH) were mixed with 3.55 g of G-18 glass powder (composition detailed in U.S. Pat. Nos. US6430966 and US6532769, hereby incorporated by reference), which was attrition milled to a particle size in the range from about 1 to ~5 microns, in a solvent mixture containing 7.68 g ethanol and 31.48 g Methyl-Ethyl-Ketone (MEK). 0.30 g of a dispersant (EMPHOS PS-236, Witco Corporation, TX) was added to the solvent mixture. The materials were ball milled in a 250 ml plastic container for about 2 hours. Then, 5.11 g of a binder (Polyvinyl Butyral B-79, SOLUTIA Inc., MO) and 4.42 g of a plasticizer (Butyl-Benzyl-Phthalate, BBP, Monsanto, Mo.) were added to the mixture and ball milled at low speed for about 16 hours. The slurry was then tape cast on a polyester film (PET) being sold under the trademark MYLAR® (DuPont Packing and Industrial Polymers, Wellington Del.), and dried at room temperature in air for a period of from 12 to 24 hours. Thickness of the MYLAR® sheets was 2 mils (1 mil=0.001 in.), a standard for tape cast processing. The MYLAR® sheets were coated on one side with silicon to prevent tape casts from adhering during drying (annealing) of the sealing (gasket) member 30 and for ease of handling in the post annealing assembly of the compressive seal 100. Other suitable materials, handling, and/or processing techniques may be selected as necessary to accommodate commercial manufacturing purposes.

Results

Figure 5:
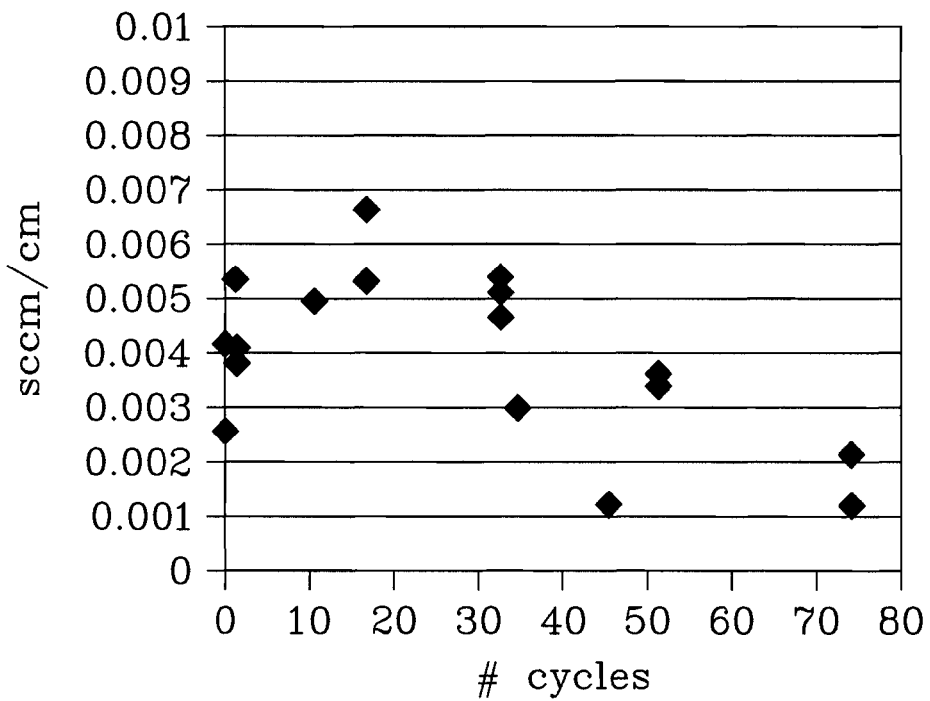
FIG. 5 shows leak rates results for a mica:glass (90 v %:10 v %) composite seal compressed at 100 psi.

FIG. 5 shows the leak rate results of the 90v % mica: 10v % glass composite tape compressed at 100 psi in a compressive seal 100. The corresponding leak data are tabulated in TABLE 3. Results show that 1) leak rates are not increasing with number of thermal cycles, clearly showing the thermal stability, and 2) leak rates are again low relative to the non-infiltrated mica [0.0049 sccm/cm after 10 cycles vs. 0.029 sccm/cm], about an order of magnitude better than the non-infiltrated mica sample. In addition, leak rates of the mica:glass seal further decreased to 0.0012 sccm/cm after 74 thermal cycles.

TABLE 3

Normalized leak rates of the mica (90 v %)-glass(10 v %) composite seals versus thermal cycles. Sample was pressed at 100 psi and leak tested at 2 psig using ultra-high purity Helium. Multiple entries represent independent readings for a given thermal cycle measurement, respectively.

| # cycles | sccmc/m |
|---|---|
| 0  | 4.2E-03 |
| 0  | 2.6E-03 |
| 1  | 3.8E-03 |
| 1  | 4.1E-03 |
| 1  | 5.4E-03 |
| 10 | 4.9E-03 |
| 16 | 5.3E-03 |
| 16 | 5.4E-03 |
| 16 | 6.7E-03 |
| 32 | 4.7E-03 |
| 32 | 5.2E-03 |
| 32 | 5.4E-03 |
| 34 | 3.0E-03 |
| 45 | 1.2E-03 |
| 51 | 3.6E-03 |
| 51 | 3.4E-03 |
| 74 | 2.1E-03 |
| 74 | 1.2E-03 |

EXAMPLE 4

In yet another embodiment, a Phlogopite 80 v % mica and 20 v % glass (G18) mica:glass composite was prepared for infiltrating the mica sealing member 30 as follows.

Experimental 21.51 g of mica flakes (Cogemica, PP120, Cogebi Inc., NH) were mixed with 6.26 g G-18 glass powder which was attrition milled to a particle size in the range from about 1 to ~5 microns in 60 g de-ionized water. 4 g of a dispersant (Darvan C, R. T. Vanderbilt Co. Inc., CT) was also added to the water to disperse the powders. The materials were ball milled in a 250 ml plastic jar for about 2 hours. Then, 10.9 g of a binder (B-1050, Duramax, Rohm&Haas, PA) was added to the mixture and milled at low speed for ~3 hours. Contents were then cast into tapes on a MYLAR® sheet. The cast tape was dried at room temperature in air as described previously.

Results

Figure 6:
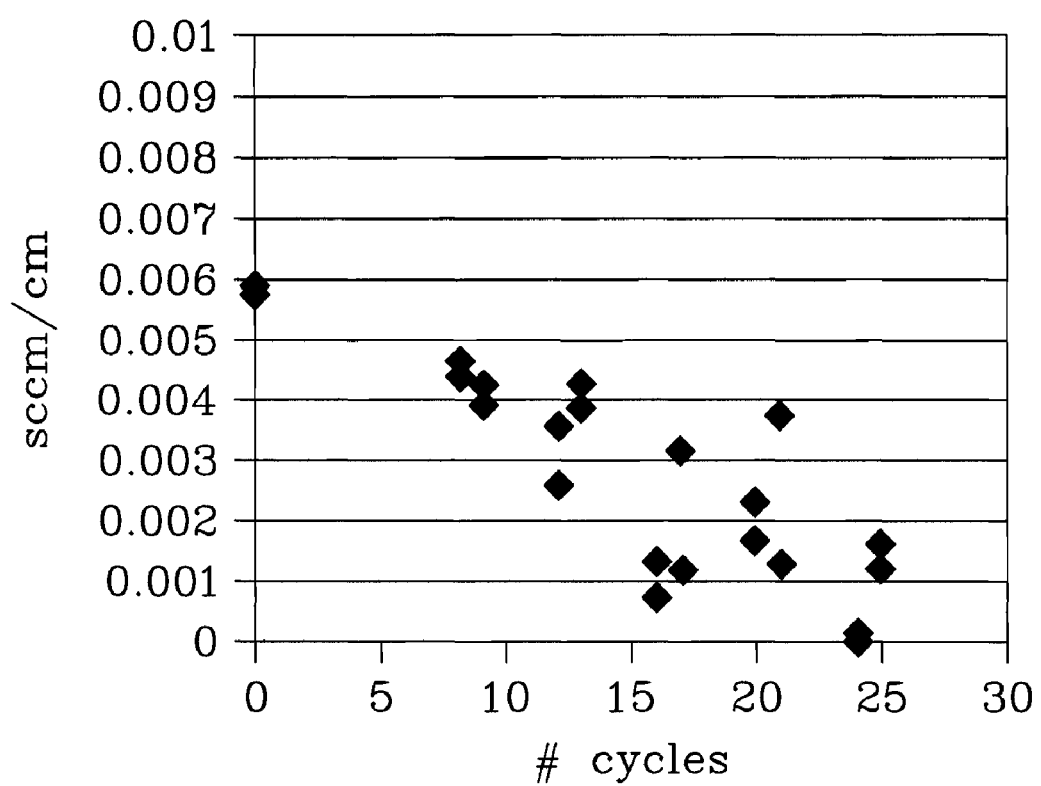
FIG. 6 shows the results of the mica:glass (80 v %:20 v %) composite seal compressed at 50 psi.

FIG. 6. shows results for the (80v %) mica: (20v %) glass composite tape compressed at a stress of 50 psi. Data are tabulated and listed in TABLE 4.

TABLE 4

Normalized leak rates of the mica (80 v %) glass (20 v %) composite seals as a function of thermal cycles. Sample seals were pressed at 50 psi and leak tested at 2 psig using ultra-high purity Helium. Multiple entries represent independent readings for a given thermal cycle measurement, respectively.

| # cycles | sccm/cm |
|---|---|
| 0 | 5.7E-03 |
| 0 | 5.9E-03 |
| 8 | 4.4E-03 |
| 8 | 4.7E-03 |
| 9 | 3.9E-03 |
| 9 | 4.2E-03 |
| 12 | 2.6E-03 |
| 12 | 3.6E-03 |
| 13 | 4.2E-03 |
| 13 | 3.9E-03 |
| 16 | 1.4E-03 |
| 16 | 8.1E-04 |
| 17 | 3.2E-03 |
| 17 | 1.2E-03 |
| 20 | 1.7E-03 |
| 20 | 2.3E-03 |
| 21 | 3.7E-03 |
| 21 | 1.3E-03 |
| 24 | 1.4E-04 |
| 24 | 1.4E-05 |
| 25 | 1.6E-03 |
| 25 | 1.2E-03 |

In Example 4, leak rate data presented for the 80 v %:20 v % (mica:glass) composites indicate that leak rates 1) are not increasing with number of thermal cycles (again evidencing thermal stability), and 2) leak rates are again low relative to the non-infiltrated mica [~0.0042 sccm/cm after 10 cycles vs. 0.029 sccm/cm for the non-infiltrated material], about an order of magnitude better than the non-infiltrated mica samples.

CLOSURE

While the preferred embodiments of the present invention have been shown and described, it will be apparent to those skilled in the art that many changes and modifications may be made without departing from the invention in its broader aspects. The appended claims are therefore intended to cover changes and modifications as fall within the true spirit and scope of the invention.

We claim:

1. A multilayer compressive seal having superior thermal cycling stability for sealing in high temperature devices, the seal comprising:
   a sealing member disposed between a first and a second compliant interlayer;
   wherein said sealing member comprises a mica paper having a plurality of mica members therein infiltrated with at least one glass forming material sealing a plurality of leak paths between said plurality of mica members within said sealing member at an operating temperature of said compressive seal; and
   wherein said sealing member provides a sufficiently low effective leak rate in said compressive seal effectively sealing said compressive seal at said operating temperature.

2. The seal according to claim 1, wherein said leak rate in said seal is less than about 1E-02 sccm/cm at operating temperatures in the range from about 600° C. to about 850° C.

3. The seal in accordance with claim 1 wherein said plurality of mica members within said mica paper of said sealing member comprises a mica selected from the group consisting of Phlogopite, Muscovite, Biotite, Fuchsite, Lepidolite, Zinnwaldite and combinations thereof.

4. The seal in accordance with claim 1 wherein at least one of said first and second complaint interlayers comprises a member selected from the group consisting of a glass, a glass-ceramic, a mica glass-ceramic, a phase-separated glass, a glass composite, a cermet, a metal, a metal foil, a metal alloy, a metal composite, a mica-glass composite, and combinations thereof.

5. The seal in accordance with claim 1 wherein said sealing member comprises a mica:glass composite having a mica-based concentration up to about 50% by volume.

6. The seal in accordance with claim 1 wherein said sealing member comprises a mica:glass composite having 90% by volume of a mica based material and 10% by volume of a glass forming material.

7. The seal in accordance with claim 1 wherein said sealing member comprises a mica:glass composite mixture of 80% by volume of a mica-based material and 20% by volume of a glass forming material.

8. The seal in accordance with claim 6 wherein said glass forming material comprises a barium calcium aluminum borosilicate glass.

9. The seal in accordance with claim 7 wherein said glass forming material comprises a barium calcium aluminum borosilicate glass.

10. The seal in accordance with claim 1, wherein said plurality of mica members within said mica paper comprise mica of a form selected from the group consisting of flakes, filaments, fragments, particles, and combinations thereof.

11. The seal in accordance with claim 1, wherein said mica paper infiltrated with said at least one glass forming material forms a mica-glass composite with said plurality of mica members within said sealing member at said operating temperature of said seal.

* * * * *